United States Patent
Atsuumi

(10) Patent No.: US 6,961,164 B2
(45) Date of Patent: Nov. 1, 2005

(54) SCANNING OPTICS WITH OPTICAL ELEMENTS FORMED OF RESIN AND OPTICAL SCANNING DEVICE AND IMAGE FORMING APPARATUS USING THE SAME

(75) Inventor: Hiromichi Atsuumi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/047,092

(22) Filed: Jan. 17, 2002

(65) Prior Publication Data

US 2002/0114051 A1 Aug. 22, 2002

(30) Foreign Application Priority Data

Jan. 19, 2001 (JP) ......................................... 2001-011226

(51) Int. Cl.$^7$ .............................................. G02B 26/08
(52) U.S. Cl. ........................................................ 359/205
(58) Field of Search ................................ 359/196, 205, 359/207, 212, 216

(56) References Cited

U.S. PATENT DOCUMENTS

| | | |
|---|---|---|
| 5,233,454 A | 8/1993 | Sakuma et al. |
| 5,355,244 A | 10/1994 | Suzuki et al. |
| 5,408,095 A | 4/1995 | Atsuumi et al. |
| 5,426,298 A | 6/1995 | Sakuma et al. |
| 5,459,601 A | 10/1995 | Suzuki et al. |
| 5,475,522 A | 12/1995 | Itabashi et al. |
| 5,504,613 A | 4/1996 | Itabashi et al. |
| 5,684,618 A | 11/1997 | Atsuumi |
| 5,999,345 A | 12/1999 | Nakajima et al. |
| 6,069,724 A | 5/2000 | Hayashi et al. |
| 6,078,419 A | 6/2000 | Atsuumi |
| 6,081,386 A | 6/2000 | Hayashi et al. |
| 6,104,522 A | 8/2000 | Hayashi et al. |
| 6,166,842 A | 12/2000 | Aoki et al. |
| 6,185,026 B1 | 2/2001 | Hayashi et al. |
| 6,188,086 B1 | 2/2001 | Masuda et al. |
| 6,198,563 B1 | 3/2001 | Atsuumi |
| 6,233,081 B1 | 5/2001 | Suzuki et al. |
| 6,256,133 B1 | 7/2001 | Suzuki et al. |
| 6,288,819 B1 | 9/2001 | Aoki et al. |
| 6,317,246 B1 | 11/2001 | Hayashi et al. |
| 6,347,004 B1 | 2/2002 | Suzuki et al. |
| 6,348,988 B2 | 2/2002 | Aoki et al. |
| 6,348,989 B2 | 2/2002 | Aoki et al. |
| 6,359,717 B2 | 3/2002 | Suzuki et al. |
| 6,366,384 B1 | 4/2002 | Aoki et al. |
| 6,376,837 B1 | 4/2002 | Itabashi et al. |
| 6,381,057 B1 | 4/2002 | Itabashi |
| 6,384,949 B1 | 5/2002 | Suzuki |
| 6,400,391 B1 | 6/2002 | Suhara et al. |
| 6,417,509 B1 | 7/2002 | Atsuumi et al. |
| 6,429,956 B2 | 8/2002 | Itabashi |
| 6,462,853 B2 | 10/2002 | Hayashi |
| 6,469,772 B1 | 10/2002 | Itabashi |
| 6,498,617 B1 | 12/2002 | Ishida et al. |
| 6,509,995 B1 * | 1/2003 | Suzuki et al. ................ 359/196 |

FOREIGN PATENT DOCUMENTS

JP          2001075032 A   *   3/2001   ........... G02B/26/10

* cited by examiner

*Primary Examiner*—Euncha P. Cherry
(74) *Attorney, Agent, or Firm*—Oblon, Spivak, McClelland, Maier & Neustadt, P.C.

(57) ABSTRACT

Scanning optics of the present invention effectively reduces the variation of the curvature of field in the main and subscanning directions ascribable to varying environment, which includes temperature and humidity. This, coupled with the fact that the scanning optics desirably corrects wavefront aberration, reduces the variation of a beam spot diameter and implements a desirable beam spot with a small diameter. A scanning device with such optics can effect desirable optical scanning with a stable, small-diameter beam spot and allows an image forming apparatus to form attractive images.

15 Claims, 9 Drawing Sheets

PV : 0.403λ
RMS : 0.095λ

PV : 0.101λ
RMS : 0.019λ

PV : 2.857λ
RMS : 0.777λ

PV : 0.031λ
RMS : 0.007λ

SCANNING OPTICS WITH OPTICAL ELEMENTS FORMED OF RESIN AND OPTICAL SCANNING DEVICE AND IMAGE FORMING APPARATUS USING THE SAME

BACKGROUND OF THE INVENTION

1. Field of the Invention

The present invention relates to scanning optics including optical elements formed of resin and an optical scanning device and an image forming apparatus using the same.

2. Description of the Background Art

A current trend in the art of image forming apparatuses including digital copiers and laser printers is toward the use of scanning optics for high-density image formation. The scanning optics requires a beam spot having a small diameter on a photoconductive element. On the other hand, an optical scanning device includes lenses many of which are formed of resin, which is low cost and implements sophisticated surface configuration.

The problem with resin lenses is that they vary in radius of curvature and refractive index due to varying environment more than glass lenses. The variation of such factors directly translates into the variation of the curvature of field and therefore an increase in beam spot diameter, resulting in defective images. It follows that resin lenses must have the variation of optical characteristics corrected.

Japanese Patent Laid-Open Publication No. 8-292388, for example, discloses a correcting method paying attention to the fact that a positive lens and a negative lens are opposite to each other as to the variation of the curvature of field ascribable to temperature variation. The method taught in the above document uses a resin lens opposite in power to a scanning resin lens and positioned on an optical path between a light source and a deflector, thereby canceling the variation of the curvature of field occurring at the scanning lens due to temperature variation. However, the resin lens intervening between the light source and the deflector has no power in the main scanning direction. The above method therefore cannot correct the variation of the curvature of field to occur at the scanning resin lens in the main scanning direction, failing to prevent the beam spot diameter from increasing in the main scanning direction.

Further, in all embodiments included in the document mentioned above, the resin lens having negative power is implemented as a flat-concave cylindrical lens. Such a lens has a radius of curvature as small as about 5 mm or 8 mm, as described in the embodiments, and is therefore difficult to machine or assemble with accuracy. This is because only the concave surface of the lens has a temperature correcting function.

Japanese Patent No. 2,804,647 teaches a method that corrects the curvature of field in the main scanning direction with a resin lens, which has power identical with, but opposite (negative) to, the power of a scanning resin lens in the main scanning direction. In addition, this method limits the position of the scanning lens for reducing the variation of the curvature of field in the subscanning direction to an acceptable level. Further, the above document proposes a method for correcting the curvature of field in the subscanning direction with a resin cylindrical lens having negative power, i.e., with a temperature correcting function assigned to a single surface. However, the former method critically limits the design freedom of the optics. This is also true with the latter method assigning the correcting function to a single surface.

The resin lens with negative power taught in the above U.S. Pat. No. 2,804,647 has an aspherical surface symmetrical with respect to the axis and a cylindrical surface both of which have negative power. However, the aspherical surface mainly implements the correction of the curvature of field in the main scanning direction and has therefore weak power. By contrast, the cylindrical surface essentially directed toward the correction of the curvature of field in the subscanning direction has strong power. As a result, the cylindrical lens has a small radius of curvature and is therefore difficult to machine or assemble with accuracy. Moreover, to provide a beam spot with desirable shape in the subscanning direction, not only the curvature of field in the geometric optics aspect but also wavefront aberration in the wave optics aspect must be corrected.

SUMMARY OF THE INVENTION

It is an object of the present invention to provide scanning optics capable of effectively reducing the variation of the curvature of field in the main and subscanning directions ascribable to varying environment and desirably correcting wavefront aberration to thereby implement a beam spot with a small diameter that varies little.

It is another object of the present invention to provide an optical scanning device using the above scanning optics.

It is a further object of the present invention to provide an image forming apparatus using the above optical scanning device.

In accordance with the present invention, scanning optics includes first optics for coupling a light beam issuing from a light source. Second optics condenses the light beam output from the first optics substantially in the form of a line elongate in the main scanning direction. A deflector includes reflection faces, which adjoin a position where the light beam is condensed in the form of a line, for deflecting the light beam with the reflection faces. Third optics condenses the light beam deflected by the deflector toward a surface to be scanned to thereby form a beam spot on the surface for optically scanning the surface. The third optics includes at least one focusing element formed of resin. The second optics includes at least one focusing element formed of resin and at least one focusing element formed of glass. At least one surface of the second optics is a non-arcuate auxiliary surface non-arcuate in a section in the subscanning direction. Among the focusing elements of the second optics, a focusing element through which the light beam output from the first optics is transmitted with the maximum diameter in the subscanning direction has the non-arcuate auxiliary surface.

An optical scanning device using the above scanning optics and an image forming apparatus including the optical scanning device are also disclosed.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1A:
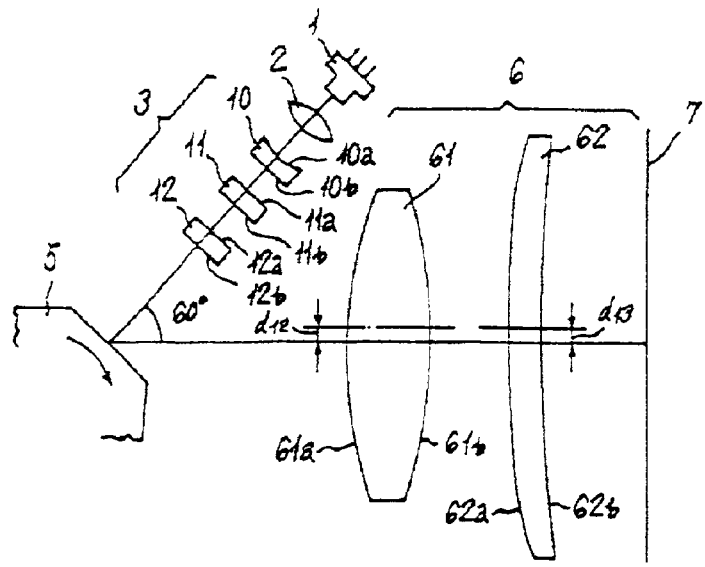
FIGS. 1A through 1C are views showing an optical scanning device embodying the present invention.
Figure 1B:
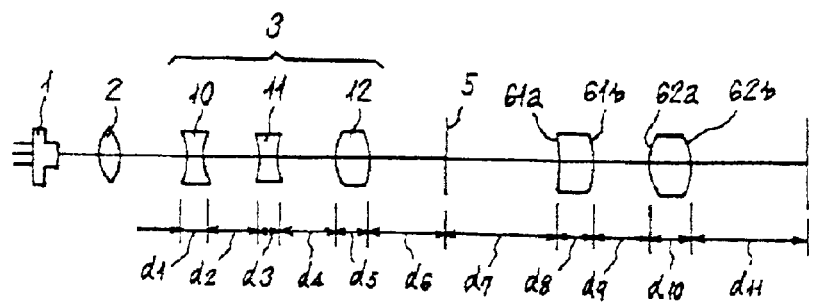
Figure 1C:
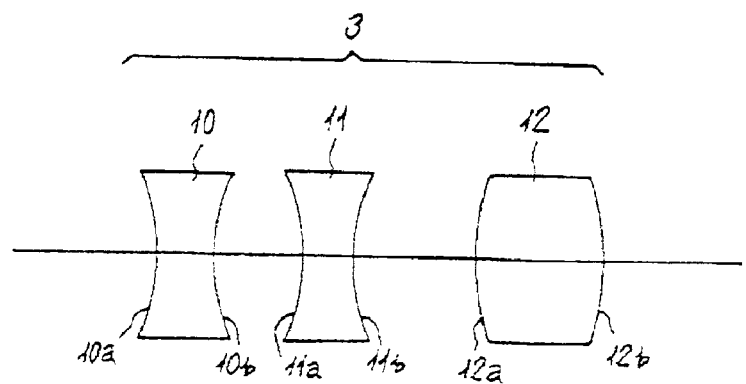

Referring to FIGS. 1A through 1C, an optical scanning device embodying the present invention is shown. As shown in FIG. 1A, the scanning device includes a semiconductor laser or light source 1 that emits a light beam. A coupling lens or first optics 2 transforms the light beam to a desired form and then couples it to optics to follow. In the illustrative embodiment, the light beam transmitted through the coupling lens 2 becomes a substantially parallel beam.

Second optics 3 condenses the substantially parallel light beam output from the coupling lens 2 substantially in the form of a line elongate in the main scanning direction. A rotatable polygonal mirror or deflector 5 includes reflection faces adjoining the substantially linear condensing section. Rotating at a constant speed, the polygonal mirror 5 deflects the incident light beam with the reflection faces at a constant angular velocity. Third optics 6 condenses the light beam deflected by the polygonal mirror 5 toward a surface 7, which is to be scanned, and thereby causes the beam to form a spot on the surface 7. The beam spot scans the surface 7 in accordance with the rotation of the polygonal mirror 5. In the illustrative embodiment, the third optics 6 is implemented by an f-θ lens for causing the beam spot to scan the surface 7 at a constant speed.

While the illustrative embodiment uses a single light beam, use may be made of multiple light beams. For example, the semiconductor laser 1 may be replaced with an LED (Light Emitting Diode) array having a plurality of emission points or a plurality of semiconductor lasers.

The coupling lens 2 may be implemented by a single aspherical lens and can desirably correct wavefront aberration alone.

In the illustrative embodiment, the third optics 6 is implemented by two lenses (focusing elements) 61 and 62 one or both of which are formed of resin. The second optics 3 includes three lenses (focusing elements) 10, 11 and 12. In the illustrative embodiment, the lenses 10 and 11 are formed of resin while the lens 12 is formed of glass.

As shown in FIG. 1C, the resin lens 10 has a spherical input surface 10a having negative power and a cylindrical output surface 10b having negative power only in the subscanning direction. The resin lens 11 next to the lens 10 has negative power only in the subscanning direction. The glass lens 12 next to the lens 11 is a toroidal lens. In this configuration, as for the main scanning direction, the input surface 10a of the lens 10 and lens 12 have negative power and positive power, respectively. More specifically, the parallel light beam output from the coupling lens 2 is incident to the input surface 10a of the lens 10 and caused to tend to diverge by the negative power thereof and is then restored to the parallel light beam by the positive power of the lens 12. Consequently, the light beam transmitted through the second optics has its diameter increased in the main scanning direction while preserving parallelism.

As for the subscanning direction, the lenses 10 and 11 of the second optics 3 have negative power each while the lens 12 has positive power. In this configuration, the light beam output from the coupling lens 2 is sequentially intensified in divergence by the lenses 10 and 11 in the subscanning direction. Subsequently, the light beam is transformed to a converging light beam by the lens 12. The light beam output from the lens 12 is incident to the vicinity of the reflection face of the polygonal mirror 5 substantially in the form of a line elongate in the main scanning direction.

The curvature of field varies in the main and subscanning directions when the distance between the light source 1 and the coupling lens 2 varies due to temperature variation and when the optical performance of the resin element or elements of the third optics 6 varies. Power variation available with the input surface 10a of the resin lens 10 in the main scanning direction corrects the variation of the curvature of field in the main scanning direction. The power of the output surface 10b of the resin lens 10 and power variation available with the input surface 11a and output surface 11b of the resin lens 11 correct the variation in the subscanning direction.

The glass lens or toroidal lens 12 of the second optics 3 may be implemented as a single lens having a cylindrical surface and a spherical surface. Alternatively, the glass lens 12 may be implemented by a cylindrical lens and a spherical lens adhered together. Further, the glass lens 12 may be provided with two cylindrical lenses different in power from each other. The glass lens 12 may even be implemented as a cylindrical lens if the form of the beam output from the coupling lens 2 is modified.

The second optics 3 includes one or more non-arcuate auxiliary surfaces. This is because such a surface or surfaces desirably correct wavefront aberration in the subscanning direction. From this point of view, the non-arcuate auxiliary surface should preferably be implemented by the surface of an optical element that enlarges the beam diameter as far as possible in the subscanning direction. It will be seen that in the illustrative embodiment the glass lens 12 maximizes the beam diameter in the subscanning direction. Therefore, one or both of the opposite surfaces of the lens 12 may be implemented as non-arcuate auxiliary surfaces. In this case, the non-arcuate surface is positioned in the vicinity of a position where the beam diameter is maximum, and can therefore effectively correct wavefront aberration. Alternatively, the resin lens 11 belonging to the second optics 3 may be formed with the non-arcuate surface because the light beam output from the first optics is transmitted through the lens 11 with the maximum diameter in the subscanning direction. In this case, too, the non-arcuate surface desirably corrects wavefront aberration because the light beam has a sufficient diameter in the subscanning direction. In addition, the resin lens 11 can be easily formed with the non-arcuate surface.

An image forming apparatus in accordance with the present invention and implemented as an optical printer by way of example will be described with reference to FIG. 2. As shown, the printer includes a photoconductive element or image carrier implemented as a drum 111. A charge roller or charging means 112, a developing device 113, an image transfer belt 114 and a cleaning device 115 are arranged around the drum 111. The charge roller 112 may be replaced with a corona charger or a charge brush, if desired. Also, the image transfer belt 114 may be replaced with an image transfer roller or a corona charger. An optical scanning device 117 optically scans the drum 111 between the charge roller 112 and the developing device 113, thereby forming a latent image on the drum 111. The scanning device 117 may have the configuration described with reference to FIGS. 1A through 1C.

Figure 2:
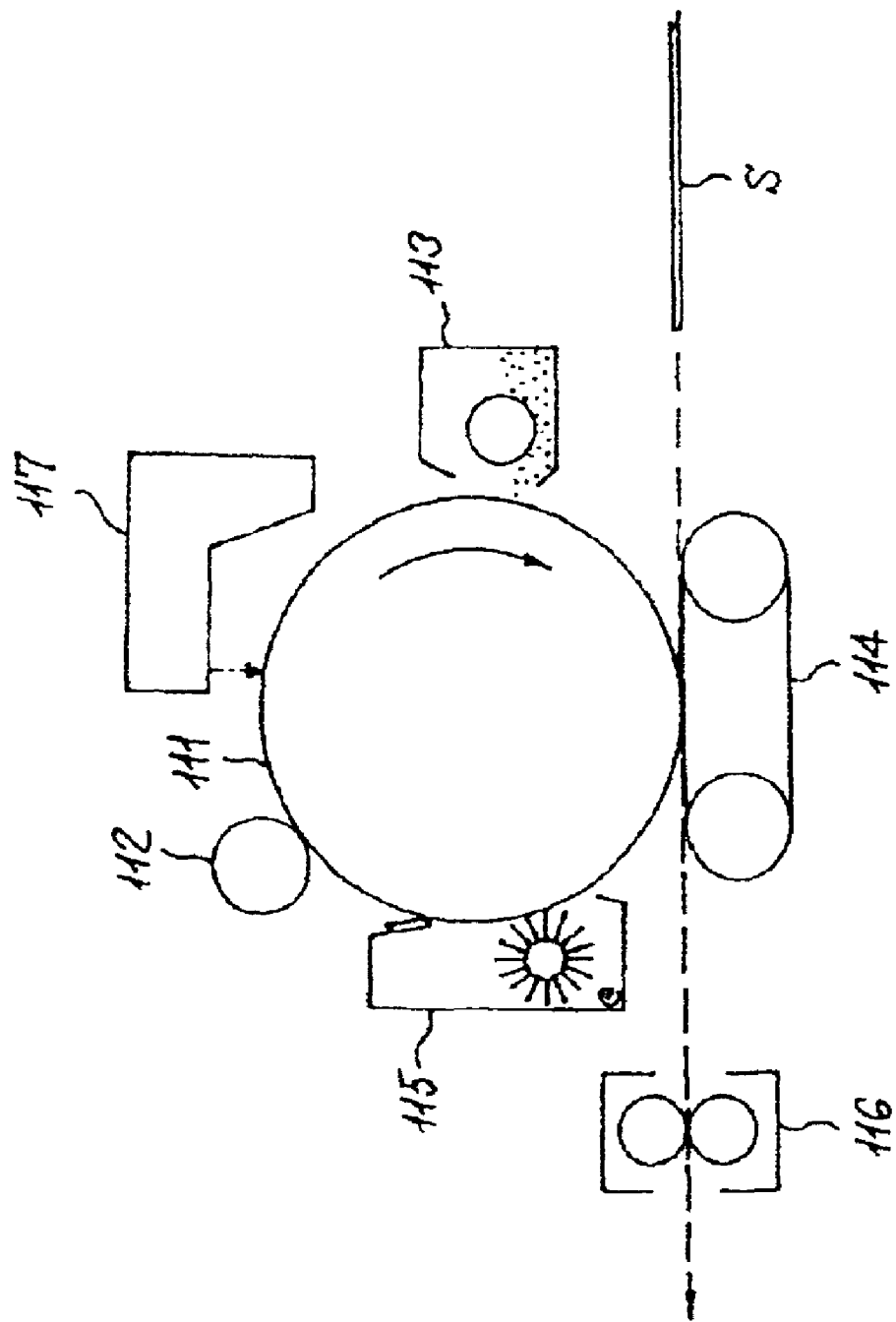
FIG. 2 is a view showing an image forming apparatus including the optical scanning device of FIG. 1.

In operation, while the drum 111 is rotated at a constant speed in a direction indicated by an arrow in FIG. 2, the charge roller 112 uniformly charges the surface of the drum 111. The scanning device 117 scans the charged surface of the drum 111 in accordance with image data to thereby form a so-called negative latent image. The developing device 113 develops the latent image for thereby producing a corresponding toner image. The toner image is transferred to a paper sheet, OHP (OverHead Projector) sheet or similar sheet S being conveyed by the belt 114. A fixing device 116 fixes the toner image on the sheet S. The sheet S with the fixed toner image is driven out of the printer. The cleaning device 115 removes toner and paper dust left on the drum 111 after the image transfer.

Hereinafter will be described examples of the scanning device having the configuration of FIGS. 1A through 1C and a comparative example. All of the examples and comparative example include the light source 1, coupling lens or first optics 2, polygonal mirror or deflector 5, and f-θ lens or third optics 6. Specifically, the light source 1 is implemented by a semiconductor laser having an emission wavelength of 780 nm. The coupling lens 2 is a single aspherical lens having a focal distance of 27 mm, effecting collimation, and having wavefront aberration desirably corrected alone. The polygonal mirror 5 has five reflection faces and an inscribed circle with a radius of 18 mm and forms an angle of 60° between the incidence angle of the light beam output from the light source 1 and the optical axis of the scanning optics. The angle of view is ±40.6°. A base member on which the lenses are mounted has a coefficient of linear expansion of $2.31 \times 10^{-5}$.

In the following description, distances d1 through d11 shown in FIG. 1B will be used as distances between planes on the optical axis, which extends from the incidence side of the second optics 3 to the surface to be scanned. In the second optics 3 shown in FIG. 1C, the lens 10 is formed of resin and has a refractive index of 1.523978 and a coefficient of linear expansion of $7 \times 10^{-5}$. The lens 11 is formed of resin and also has a refractive index of 1.523978 and a coefficient of linear expansion of $7 \times 10^{-5}$. Further, the lens 12 is formed of glass and has a refractive index of 1.733278 and a coefficient of linear expansion of $5.4 \times 10^{-6}$. The refractive indices are measured with light having a wavelength of 780 nm at 25° C.

In the examples and comparative example, the configuration of each lens is specified by the following factors. Configuration in the main scanning direction refers to configuration in a sectional plane that is a virtual, planar section parallel to the main scanning direction and containing the optical axis of the lens. Assume that the optical axis has a paraxial radius of curvature of Rm, that a distance from the optical axis is Y, that a conical constant is K, and that high-order coefficients are A1, A2, A3, A4, A5, A6 and so forth. Then, assuming that the depth in the direction of optical axis is X, the configuration in the main scanning direction is expressed by a polynomial:

$$X=(Y^2/Rm)/[1+\sqrt{1-(1+K)(Y/Rm)^2}]+A1 \cdot Y+A2 \cdot Y^2+A3 \cdot Y^3+A4 \cdot Y^4+A5 \cdot Y^5+A6 \cdot Y^6 \quad \text{Eq. (1)}$$

In the above Eq. (1), when the odd-order coefficient is other than zero, the configuration in the main scanning direction is asymmetrical to the optical axis (Y=0).

Configuration in the subscanning direction refers to configuration in a section in the subscanning direction spaced from the optical axis by a distance of Y. By using a coordinate Y in the main scanning direction and a coordinate Z in the subscanning direction, the configuration in the subscanning direction is expressed as:

$$fs\ (Y,Z) = (Z^2 \cdot Cs\ (Y))/[1+\sqrt{1-(1+Ks\ (Y))\ (Z \cdot Cs(Y)^2)}]$$
$$+(F0+F1 \cdot Y+F2 \cdot Y^2+F3 \cdot Y^3+F4 \cdot Y^4+\ldots)Z$$
$$+(G0+G1 \cdot Y+G2 \cdot Y^2+G3 \cdot Y^3+G4 \cdot Y^4+\ldots)Z^2$$
$$+(H0+H1 \cdot Y+H2 \cdot Y^2+Y3 \cdot Y^3+H4 \cdot Y^4+\ldots)Z^3$$
$$+(I0+I1 \cdot Y+I2 \cdot Y^2+I3 \cdot Y^3+I4 \cdot Y^4+\ldots)Z^4$$
$$+(J0+J1 \cdot Y+J2 \cdot Y^2+J3 \cdot Y^3+J4 \cdot Y^4+\ldots)Z^5$$
$$+\ldots \quad \text{Eq. (2)}$$

In the Eq. (2), Cs(Y) and Ks(Y) included in the first term of the right side are expressed as:

$$Cs\ (Y)=(1/Rs0)+B1 \cdot Y+B2 \cdot Y^2+B3 \cdot Y^3+B4\ \cdot Y^4+B5 \cdot Y^5+\ldots \quad \text{Eq. (3)}$$

$$Ks\ (Y)=Ks0+C1 \cdot Y+C2 \cdot Y^2+C3 \cdot Y^3+C4 \cdot Y^4+C5 \cdot Y^5+\ldots \quad \text{Eq. (4)}$$

More specifically, Cs(Y) and Ks(Y) respectively denote the paraxial curvature of the configuration in the auxiliary scanning section at Y and the conical constant of the same configuration at Y. Further, Rs0 denotes the radius of paraxial curvature in the subscanning section containing the optical axis (Y=0). It is to be noted that assuming that Z included in the Eq. (2) is zero, then fs(Y,0) is zero. However, this portion has the configuration represented by the Eq. (1) in the section in the main scanning direction, so that the three-dimensional configuration of the lens surface is represented by the sum of the Eqs. (1) and (2).

The configurations of the lenses 61 and 62 constituting the third optics 6 are common to all of the examples and comparative example, as stated earlier. The configurations and positions of the lenses 61 and 62 will be described first with reference to FIGS. 1A and 1B. In FIG. 1A, d12 and d13 are respectively representative of the amount of shift of the lens 61 and that of the lens 62 in the main scanning direction. Such shifts successfully reduce the influence of sag.

The lens 61 has an input surface 61a having the following configuration:

Rm=−1.30.233346, Rs=−89.518927

A0=−4.041619E+02

A4=6.005017E−08

A6=−7.538155E−13

A8=−4.036824E−16

A10=4.592164E−20

A12=2.396524E−24

B1=−9.317851E−06

B2=3.269905E−06

B3=4.132497E−09

B4=−4.207716E−10

B5=−1.170114E−12

B6=4.370640E−14

B7=2.347965E−16

B8=−6.212795E−18

B9=−3.967994E−20

B10=−3.873869E−21

B11=3.816823E−24

B12=4.535843E−25

Because the coefficient Bi includes an odd-order non-zero term, the curvature of the surface 61a in the section in the subscanning direction varies asymmetrically to the optical axis.

The lens 61 has an output surface 61b having the following configuration:

Rm=−109.082474, Rs=−110.881332
A0=−5.427642E−01
A4=9.539024E−08
A6=4.882194E−13
A8=−1.198993E−16
A10=5.029989E−20
A12=−5.654269E−24
B2=−3.652575E−07
B4=2.336762E−11
B6=8.426224E−14
B8=−1.026127E−17
B10=−2.202344E−21
B12=1.224555E−26

Because the coefficient Bi does not include an odd-order non-zero term, the curvature of the surface 61b in the section in the subscanning direction varies symmetrically to the optical axis.

The lens 62 has an input surface 62a having the following configuration:

Rm=1493.654587, Rs=−70.072432
A0=5.479389E+01
A4=−7.606757E−09
A6=−6.311203E−13
A8=6.133813E−17
A10=−1.482144E 21
A12=2.429275E−26
A14=−1.688771E−30
B2=−8.701573E−08
B4=2.829315E−11
B6=−1.930080E−15
B8=2.766862E−20
B10=2.176995E−24
B12=−6.107799E−29

The lens 62 has a configuration symmetrical to the optical axis in the main scanning section and a curvature in the subscanning section also symmetrical to the optical axis.

The lens 62 has an output surface 62b having the following configuration (non-arcuate auxiliary surface):

Rm=1748.583900, Rs=−28.034612
A0=−5.488740E+02
A4=−4.978348E−08
A6=2.325104E−12
A8=−7.619465E−17
A10=3.322730E−21
A12=−3.571328E−26
A14=−2.198782E−30
B1=−1.440188E−06
B2=4.696142E−07
B3=1.853999E−11
B4=−4.153092E−11
B5=−8.494278E−16
B6=2.193172E−15
B7=9.003631E−19
B8=−9.271637E−21
B9=−1.328111E−22
B10=−1.409647E−24
B11=5.520183E−27
B12=4.513104E−30

C0=−9.999999E−01
I0=−1.320849E−07
I2=−1.087674E−11
I4=−9.022577E−16
I6=−7.344134E−20
K0=9.396622E−09
K2=1.148840E−12
K4=8.063518E−17
K6=−1.473844E−20

The distances between the planes and the amounts of shit are as follows:

d7=71.6 mm, d8=30 mm, d9=66.3 mm, d10=8.5 mm, d11=159.3 mm, d12=0.2 mm, d13=0.2 mm

The lenses 61 and 62 each have a refractive index of 1.523978 ($\lambda$=780 nm; 25° C.) and a coefficient of linear expansion of $7\times10^{-5}$. It is to be noted that among the numerical values stated above, "E-20", for example, is representative of $10^{-20}$.

Hereinafter will be described Examples 1 and 2 and a comparative example in detail.

EXAMPLE 1

Figure 3A:
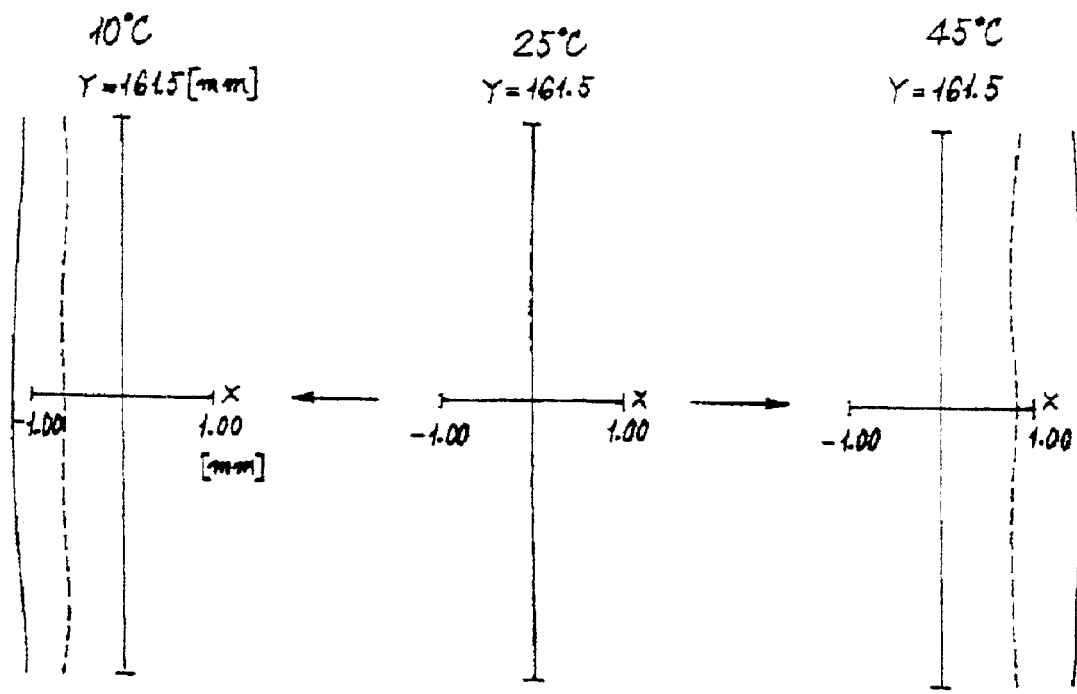
FIGS. 3A and 3B demonstrate effects achievable with Examples 1 and 2 of the illustrative embodiment in the geometric optics aspect.

In Example 1, the non-arcuate auxiliary surface is applied to the input surface of the glass lens 12 included in the second optics 3. The surfaces of the respective lenses have the following configurations:

radius of curvature of lens surface 10a:
    −119.97 mm (spherical)
radius of curvature of lens surface 10b:
    main scanning∞subscanning 16.4 mm
radius of curvature of lens surface 11a:
    main scanning∞subscanning −16 mm
radius of curvature of lens surface 11b:
    main scanning∞subscanning 18.03 mm
radius of curvature of lens surface 12a (paraxial)
    main scanning 1.0E+8
    subscanning 13.54 mm (non-arcuate)
radius of curvature of lens surface 12b:
    −186 mm (spherical)
configuration of lens surface 12a:
    Rm=1.00+08, Rs=13.54
    A4=−1.167576−07
    A6=1.236756−11
    C0=−8.413895−01
    C2=−7.014231−04
    C4=7.664337−05
    C6=7.406181−06
    C8=−8.915899−08
    I0=−5.984409−05
    I2=−9.295456−08
    I4=−1.267730−08
    I6=1.645283−10
    I8=−5.745329−12
    K0=1.108638−08
    K2=1.241363−08
    K4=−9.523815−11
    K8=6.477626−14
distances between planes:
    d1=3 mm, d2=9.2 mm, d3=3 mm, d4=3 mm
    d5=6 mm, d6=114 mm FIG. 3A shows curvatures of field particular to a comparative example and measured at temperatures of 10° C., 25° C. (designed value) and 45° C. in the main and subscanning directions. In the comparative example, the second optics 3 of Example 1 was replaced with a cylindrical lens formed of glass and having a focal distance of 45 mm. As shown, at 45° C., the curvature of field varies by about 1 mm in the main scanning direction (phantom line) and by about 1.5 mm in the subscanning direction (solid line) from the designed value. At 10° C., the curvature of field varies by about 0.7 mm in the main scanning direction (phantom line) and by about 1.2 mm in the subscanning direction (solid line).

Figure 3B:
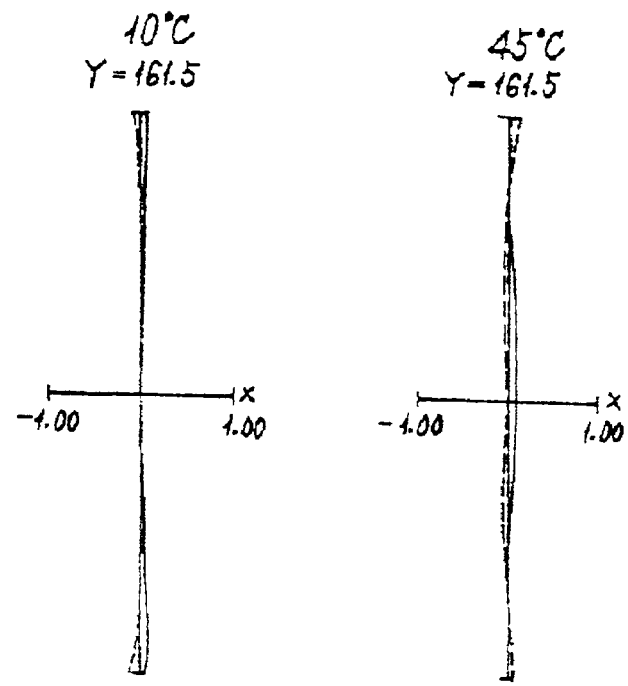

FIG. 3B shows curvatures of field particular to Example 1 and measured at temperatures of 10° C. and 45° C. in the main and subscanning directions. As shown, the curvature of field varies by only about 0.1 mm in both of the main and subscanning directions. Example 1 is therefore little susceptible to temperature variation.

Figure 4A:
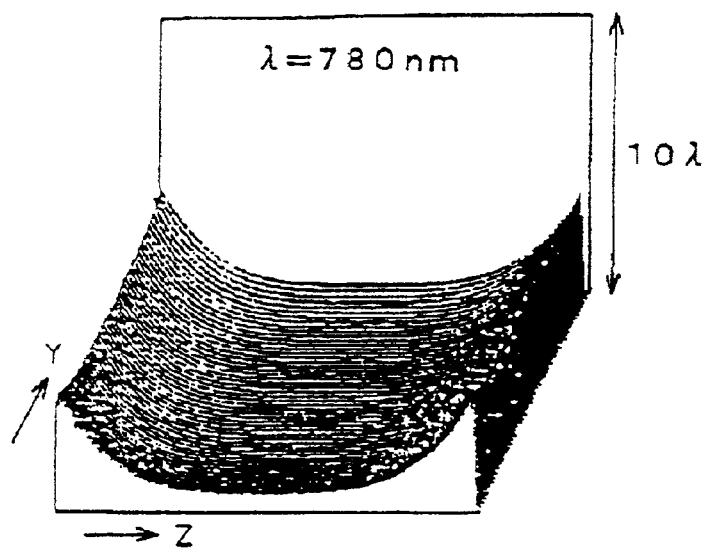
FIGS. 4A, 4B, 5A and 5B demonstrate advantages achievable with a non-arcuate auxiliary surface applied to third optics included in the illustrative embodiment.

As for the correction of wavefront aberration, FIG. 4A shows wavefront aberration measured with the comparative example, which did not include the non-arcuate auxiliary surface in the third optics, at the zero image height of a beam spot. Such wavefront aberration makes it impossible to desirably reduce the diameter of a beam spot.

Figure 4B:
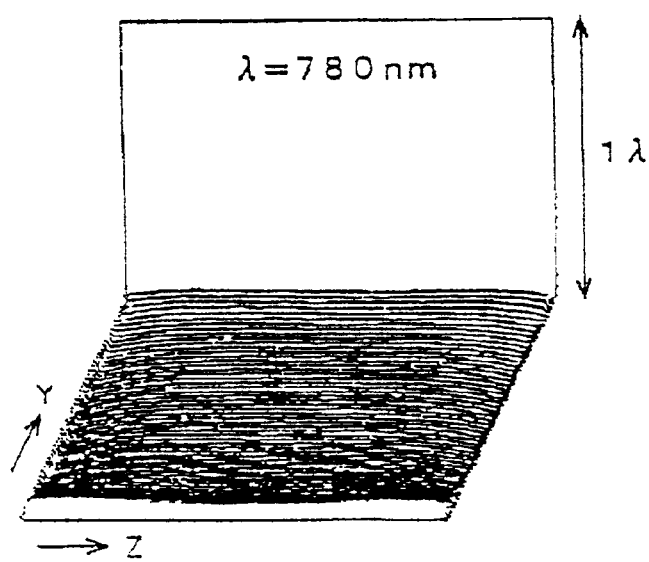
Figure 5A:
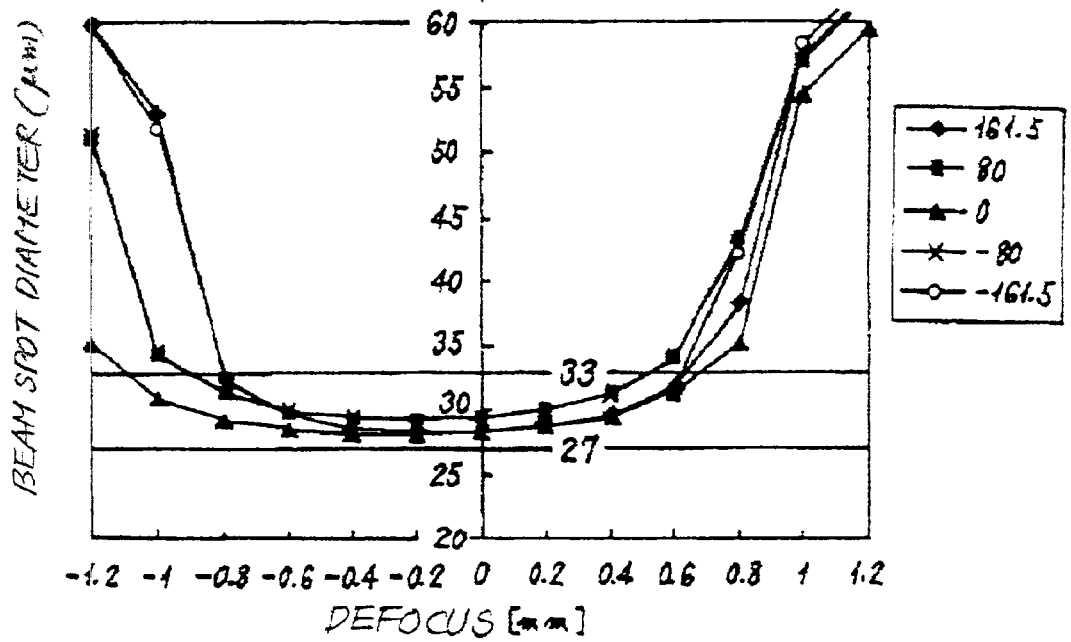
Figure 5B:
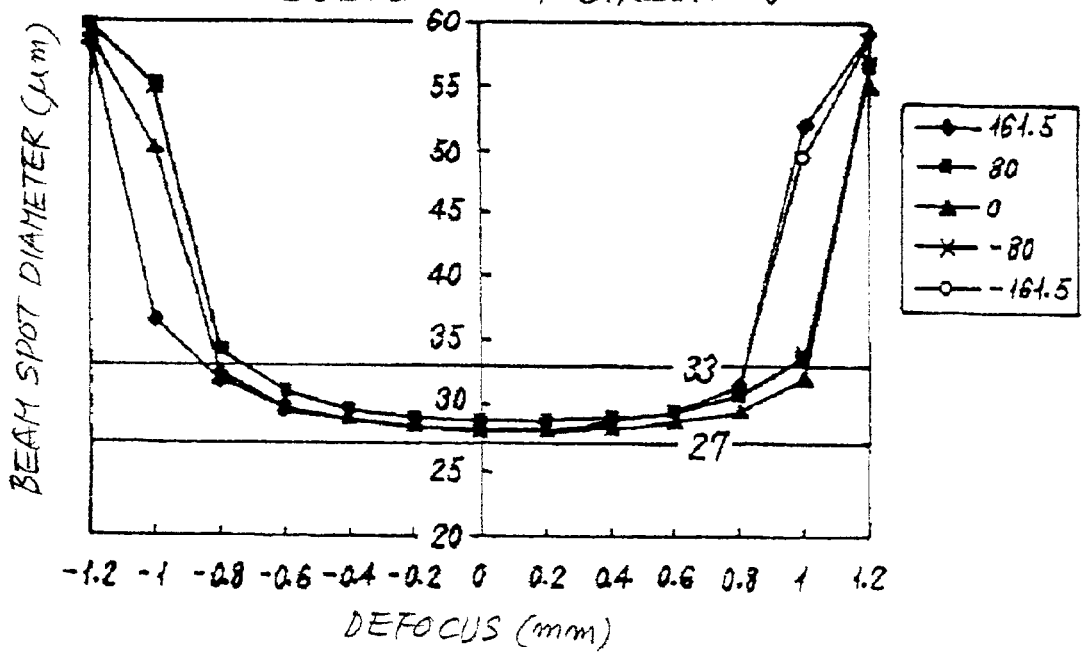

Assume that the non-arcuate auxiliary surface is applied to the output surface 62b of the lens 62 of the third optics as in the comparative example. Then, as shown in FIG. 4B, the wavefront aberration at zero image height is desirably corrected. Further, assume that the target beam spot diameter is 30±3 µm. Then, a depth of 1 mm or above is guaranteed in both of the main scanning direction (FIG. 5A) and subscanning direction (FIG. 5B). However, considering temperature variation, the curvature of field varies by more than 1 mm in both of the main and subscanning directions. This makes it impossible to implement a beam spot diameter stable against temperature variation.

Figure 6A:
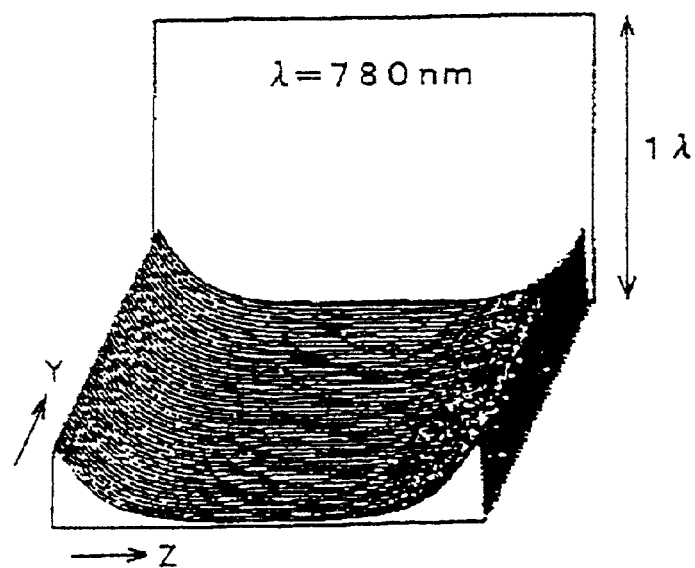
FIGS. 6A, 6B, 7A and 7B demonstrate how Example 1 corrects wavefront aberration.

FIG. 6A shows wavefront aberration at the zero image height of a beam spot determined with Example 1, but without the non-arcuate auxiliary surface applied to the second optics 3. As shown, the wavefront aberration is worse than when the second optics 3 is implemented by the glass cylindrical lens of the comparative example.

Figure 6B:
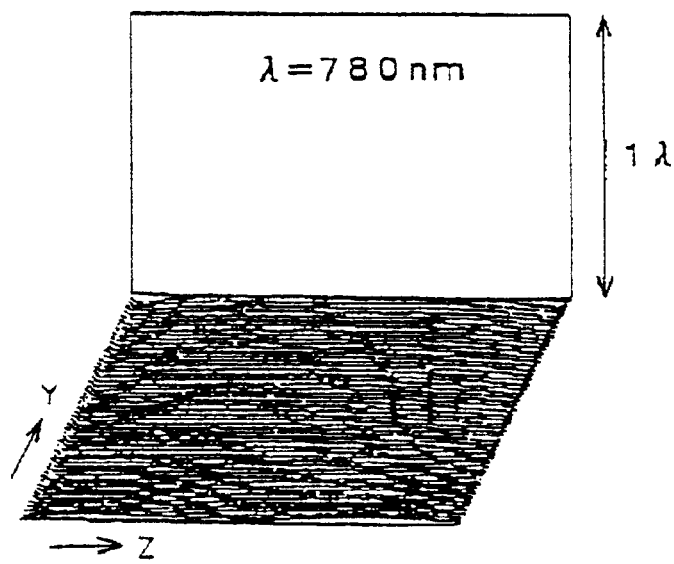
Figure 7A:
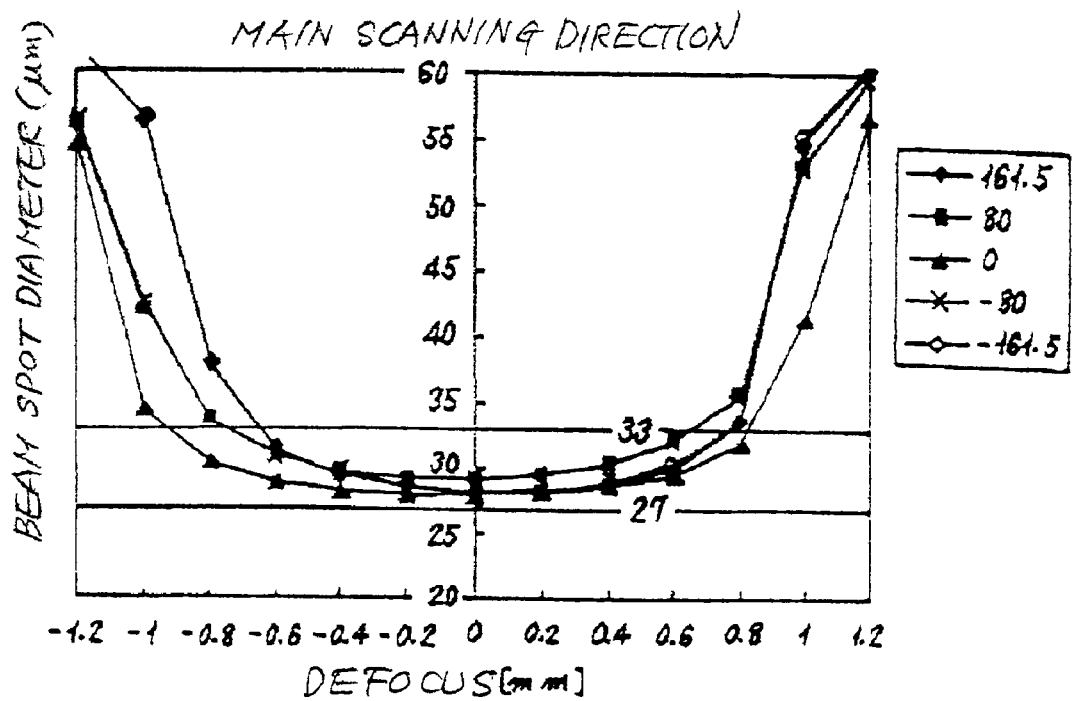
Figure 7B:
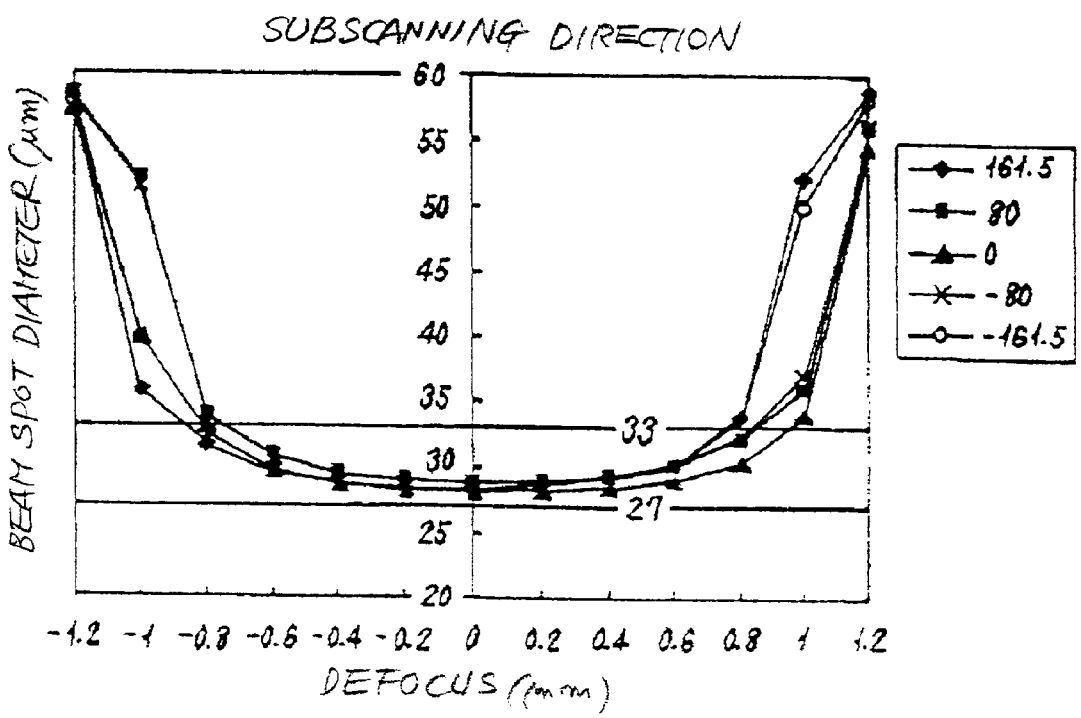

Even when the second optics 3 lacks the non-arcuate auxiliary surface, the variation of the curvature of field ascribable to temperature variation is desirably corrected in the geometrical optics aspect (paraxially), as shown in FIG. 3B. However, as shown in FIG. 6A, wavefront aberration is aggravated and prevents beam spot diameter from being reduced. By contrast, the non-arcuate auxiliary surface applied to the input surface 12a of the lens 12 in Example 1 desirably corrects wavefront aberration, as shown in FIG. 6B. Consequently, when the target beam spot diameter is 30±3 µm, a depth of 1 mm or above is insured in both of the main scanning direction (FIG. 7A) and subscanning direction (FIG. 7B).

While Example 1 applies a single non-arcuate auxiliary surface to the second optics 3, two or more non-arcuate auxiliary surfaces are, of course, applicable to the second optics 3 and achieve the same or even higher performance than a single non-arcuate surface.

EXAMPLE 2

Example 2 to be described hereinafter applies the non-arcuate auxiliary surface to the output surface of the resin lens 11 included in the second optics 3. The surfaces of the respective lenses have the following configurations:

radius of curvature of lens surface 10a:
  −119.97 mm (spherical)
radius of curvature of lens surface 10b:
  main scanning∞subscanning 16.4 mm
radius of curvature of lens surface 11a:
  main scanning∞subscanning −16 mm
radius of curvature of lens surface 11b:
  main scanning∞subscanning 18.03 mm
radius of curvature of lens surface 12a (paraxial):
  main scanning 1.0E+8
  subscanning 13.54 mm (non-arcuate)
radius of curvature of lens surface 12b:
  −186 mm (spherical)

That is, the paraxial data of Example 2 are identical with the paraxial data of Example 1.

The configuration of lens surface 11b is as follows:

Rm=1.00+08, Rs=18.03
A4=1.287048E−07
A6=1.615827E−09
C0=3.681387E+01
C2=1.882281E−01
C4=1.542188E−02
C6=−4.096661E−04
C8=5.584789E−06
I0=3.496085E−04
I2=−2.319818E−06
I4=−7.859564E−08
I6=7.462640E−10
I8=−2.952126E−11
K0=6.055635E−06
K2=−1.070845E−06
K4=−1.023609E−09
K8=−2.307748E−11 distances between planes:
d1=3 mm, d2=9.2 mm, d3=3 mm
d4=8.15 mm, d5=6 mm, d6=114 mm Example 2 is identical with Example 1 as to paraxial data. Therefore, the curvature of field in the geometric optics aspect is the same as one at 25° C. shown in FIG. 3A in the designed condition or the same as one at 10° C. and 45° C. shown in FIG. 3B.

Figure 8:
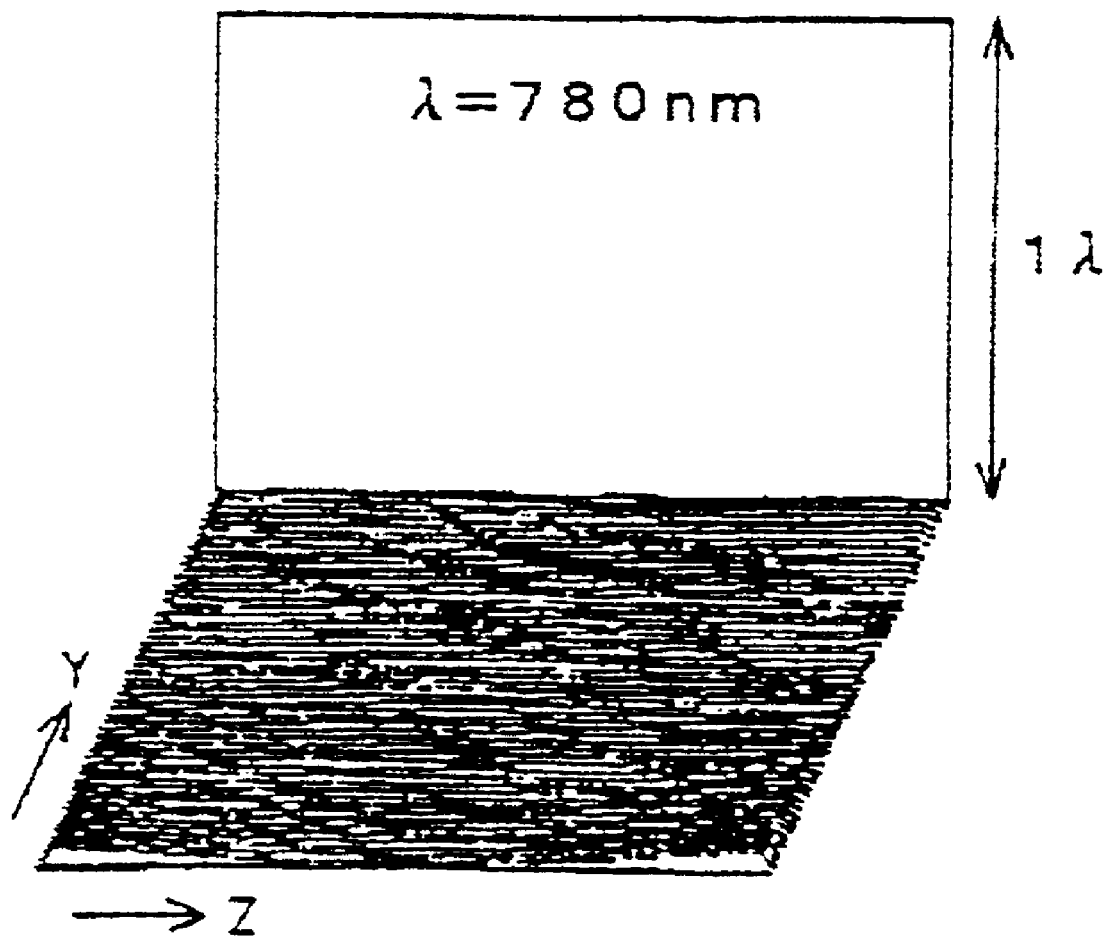
FIGS. 8, 9A and 9B demonstrates how Example 2 of the illustrative embodiment corrects wavefront aberration.
Figure 9A:
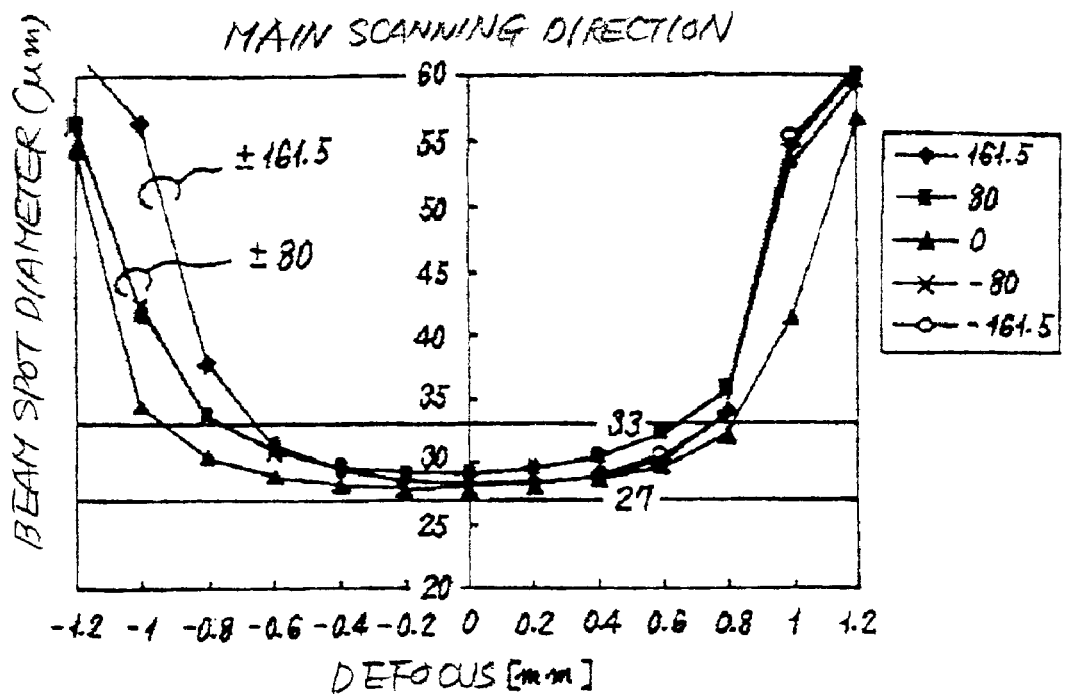
Figure 9B:
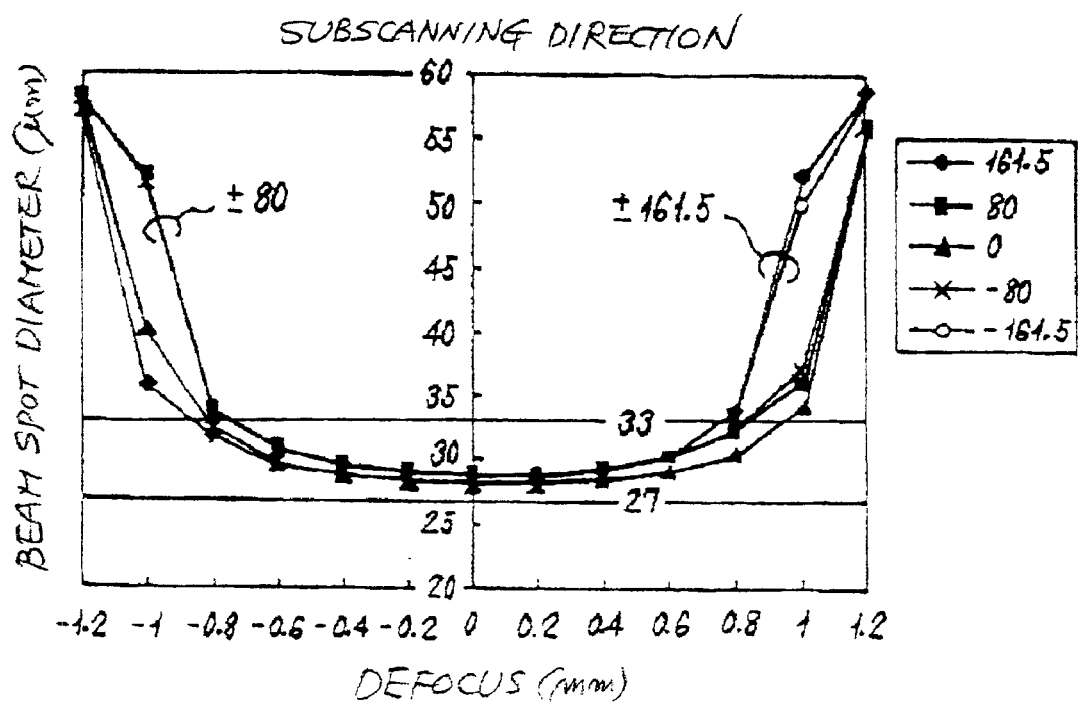

As shown in FIG. 8, wavefront aberration at the zero image height of the beam spot is desirably corrected, so that the beam spot can be desirably reduced. More specifically, when the target beam spot diameter is 30±3 µm, Example 2 can also guarantee a depth of 1 mm or above in both of the main scanning direction (FIG. 9A) and subscanning direction (FIG. 9B). It is to be noted that in FIGS. 4A, 4E, 6A, 6B and 8, PV and RMS stand for a peak-to-valley gap and a route mean square, respectively. In summary, it will be seen that the present invention provides scanning optics capable of effectively reducing the variation of the curvature of field in the main and subscanning directions ascribable to varying environment, which includes temperature and humidity. This, coupled with the fact that the scanning optics desirably corrects wavefront aberration, reduces the variation of a beam spot diameter and implements a desirable beam spot with a small diameter. A scanning device with such optics can effect desirable optical scanning with a stable, small-diameter beam spot and allows an image forming apparatus to form attractive images.

Various modifications will become possible for those skilled in the art after receiving the teachings of the present disclosure without departing from the scope thereof.

What is claimed is:

1. Scanning optics comprising:
first optics for coupling a light beam issuing from a light source;

second optics for condensing the light beam output from said first optics substantially in a form of a line elongated in a main scanning direction;

a deflector including reflection faces, which adjoin a position where the light beam is condensed in the form of a line, for deflecting said light beam with said reflection faces; and third optics for condensing the light beam deflected by said deflector toward a surface to be scanned to thereby form a beam spot on said surface for optically scanning said surface;

wherein said third optics includes at least one focusing element formed of resin;

said second optics includes at least one focusing element formed of resin and at least one focusing element formed of glass, at least one surface of said second optics comprises a non-arcuate auxiliary surface non-arcuate in a section in a subscanning direction, and among said focusing elements of said second optics, a focusing element on which the light beam output from said first optics is transmitted with a maximum diameter in the subscanning direction comprises said at least one non-arcuate auxiliary surface.

2. The scanning optics as claimed in claim 1, wherein said third optics includes at least one non-arcuate auxiliary surface.

3. The scanning optics as claimed in claim 1, wherein among said focusing elements of said second optics, a surface of the focusing element through which the light beam output from said first optics is transmitted with the maximum diameter in the subscanning direction comprises said at least one non-arcuate auxiliary surface.

4. The scanning optics as claimed in claim 3, wherein the at least one focusing element formed of resin of said second optics comprises two lenses formed of resin and the at least one focusing element formed of glass of said second optics comprises a single lens formed of glass, said two lenses formed of resin adjoin said first optics and have negative power in the subscanning direction, said single lens formed of glass adjoins said deflector and has positive power in the subscanning direction, and at least one of said two lenses formed of resin has power in the main scanning direction opposite to power of said focusing element of said third optics formed of resin in the main scanning direction.

5. The scanning optics as claimed in claim 4, wherein one of said two lenses formed of resin has a concave, spherical input surface and a concave, cylindrical output surface and adjoins said first optics, the other of said two lenses comprises a cylindrical lens having negative power in the subscanning direction, and said single lens formed of glass comprises a toroidal lens having positive power in the main and subscanning directions and is positioned closer to said deflector than said cylindrical lens and has a non-arcuate auxiliary input surface.

6. Then scanning optics as claimed in claim 5, wherein said third optics includes said at least one non-arcuate auxiliary surface.

7. The scanning optics as claimed in claim 1, wherein the at least one focusing element formed of resin of said second optics comprises two lenses formed of resin and the at least one focusing element formed of glass of said second optics comprises a single lens formed of glass, said two lenses formed of resin adjoin said first optics and have negative power in the subscanning direction, said single lens formed of glass adjoins said deflector and has positive power in the subscanning direction, and at least one of said two lenses formed of resin has power in the main scanning direction opposite to power of said focusing element of said third optics formed of resin in the main scanning direction.

8. The scanning optics as claimed in claim 7, wherein one of said two lenses formed of resin has a concave, spherical input surface and a concave, cylindrical output surface and adjoins said first optics, the other of said two lenses comprises a cylindrical lens having negative power in the subscanning direction, and said single lens formed of glass comprises a toroidal lens having positive power in the main and subscanning directions and is positioned closer to said deflector than said cylindrical lens and has a non-arcuate auxiliary input surface.

9. The scanning optics as claimed in claim 8, wherein said third optics includes said at least one non-arcuate auxiliary surface.

10. In an optical scanning device including scanning optics that couples a light beam issuing from a light source with first optics, condenses a coupled light beam with second optics substantially in a form of a line elongated in a main scanning direction, deflects a condensed light beam with a deflector including reflection faces, which adjoin a position where said light beam is condensed in the form of a line, and then condenses a deflected light beam toward a surface to be scanned with third optics to thereby form a beam spot on said surface for thereby optically scanning said surface, said third optics includes at least one focusing element formed of resin, said second optics includes at least one focusing element formed of resin and at least one focusing element formed of glass, at least one surface of said second optics comprises a non-arcuate auxiliary surface non-arcuate in a section in a subscanning direction, and among said focusing elements of said second optics, a focusing element on which the light source output from said first optics is transmitted with a maximum diameter in the subscanning direction comprises said at least one non-arcuate auxiliary surface.

11. In an optical scanning device including scanning optics that couples a light beam issuing from a light source with first optics, condenses a coupled light beam with second optics substantially in a form of a line elongated in a main scanning direction, deflects a condensed light beam with a deflector including reflection faces, which adjoin a position where said light beam is condensed in the form of a line, and then condenses a deflected light beam toward a surface to be scanned with third optics to thereby form a beam spot on said surface for thereby optically scanning said surface, said third optics includes at least one focusing element formed of resin, said second optics includes at least one focusing element formed of resin and at least one focusing element formed of glass, at least one surface of said second optics comprises a non-arcuate auxiliary surface non-arcuate in a section in a subscanning direction, and among said focusing elements of said second optics, a focusing element formed of resin on which the light beam output from said first optics is transmitted with a maximum diameter in the subscanning direction comprises said at least one non-arcuate auxiliary surface.

12. In an image forming apparatus including an optical scanning device for scanning an image carrier, said optical scanning device comprising scanning optics that couples a light beam issuing from a light source with first optics, condenses a coupled light beam with second optics substantially in a form of a line elongated in a main scanning direction, deflects a condensed light beam with a deflector including reflection faces, which adjoin a position where said light beam is condensed in the form of a line, and then condenses a deflected light beam toward a surface of said image carrier with third optics to thereby form a beam spot on said surface for thereby optically scanning said surface, said third optics includes at least one focusing element formed of resin, said second optics includes at least one focusing element formed of resin and at least one focusing element formed of glass, at least one surface of said second optics comprises a non-arcuate auxiliary surface non-arcuate in a section in a subscanning direction, and among said focusing elements of said second optics, a focusing element on which the light beam output from said first optics is transmitted with a maximum diameter in the subscanning direction comprises said at least one non-arcuate auxiliary surface.

13. The apparatus as claimed in claim 12, wherein said image carrier comprises a photoconductive element, and said optical scanning device forms a latent image on said photoconductive element.

14. In an image forming apparatus including an optical scanning device for scanning an image carrier, said optical scanning device comprising scanning optics that couples a light beam issuing from a light source with first optics, condenses a coupled light beam with second optics substantially in a form of a line elongated in a main scanning direction, deflects a condensed light beam with a deflector including reflection faces, which adjoin a position where said light beam is condensed in the form of a line, and then condenses a deflected light beam toward a surface of said image carrier with third optics to thereby form a beam spot on said surface for thereby optically scanning said surface, said third optics includes at least one focusing element formed of resin, said second optics includes at least one focusing element formed of resin and at least one focusing element formed of glass, at least one surface of said second optics comprises a non-arcuate auxiliary surface non-arcuate in a section in a subscanning direction, and among said focusing elements of said second optics, a focusing element formed of resin on which the light beam output from said first optics is transmitted with a maximum diameter in the subscanning direction comprises said at least one non-arcuate auxiliary surface.

15. The apparatus as claimed in claim 14, wherein said image carrier comprises a photoconductive element, and said optical scanning device forms a latent image on said photoconductive element.

* * * * *